June 9, 1925.
C. B. AMES ET AL
1,541,092
APPARATUS FOR ASSEMBLING TREAD UNITS
Filed Aug. 19, 1921.    2 Sheets-Sheet 1
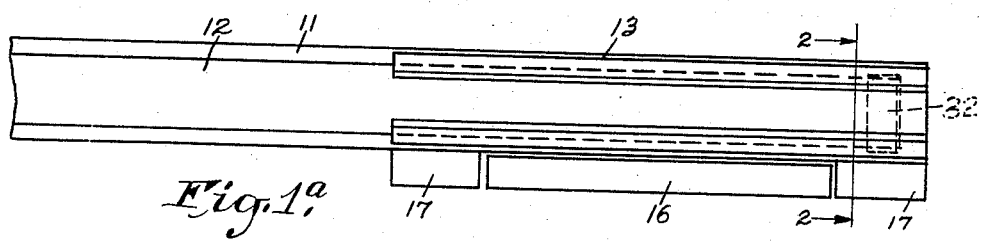
Fig.1ª
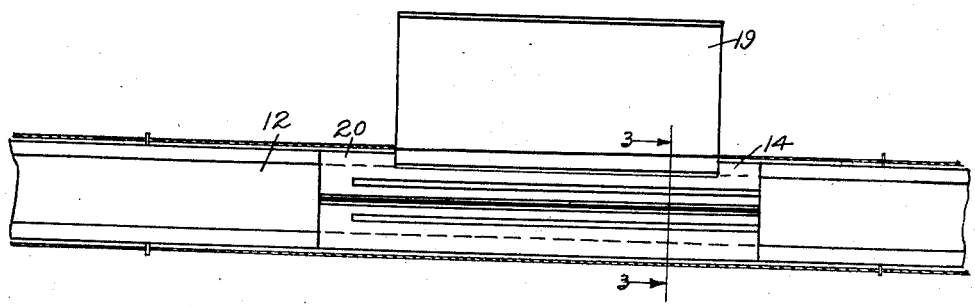
Fig.1ᵇ
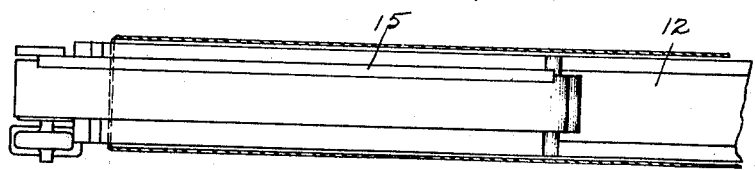
Fig.1ᶜ
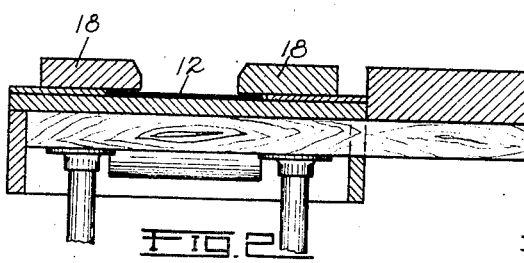
Fig.2
CORNELIUS B. AMES
GEORGE F. WIKLE
INVENTORS
BY  *Hadly Freeman*
ATTORNEY June 9, 1925.                          1,541,092
C. B. AMES ET AL
APPARATUS FOR ASSEMBLING TREAD UNITS
Filed Aug. 19, 1921      2 Sheets-Sheet 2
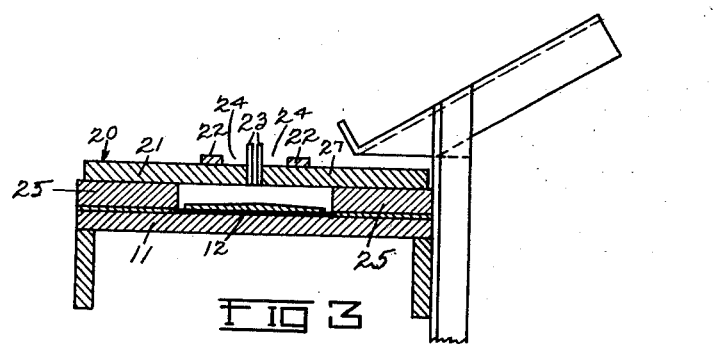
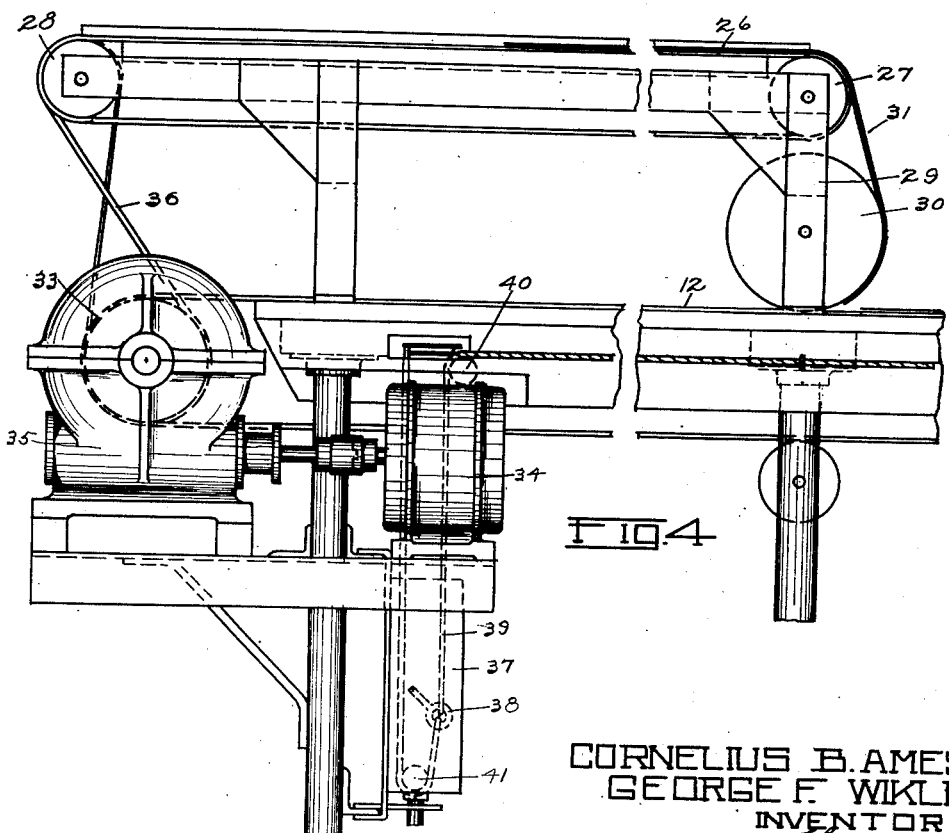
CORNELIUS B. AMES
GEORGE F. WIKLE
INVENTORS
BY
ATTORNEY Patented June 9, 1925.

1,541,092

UNITED STATES PATENT OFFICE.

CORNELIUS B. AMES, OF CUDAHY, AND GEORGE F. WIKLE, OF MILWAUKEE, WISCONSIN, ASSIGNORS, BY MESNE ASSIGNMENTS, TO THE FISK RUBBER COMPANY, OF CHICOPEE FALLS, MASSACHUSETTS, A CORPORATION OF MASSACHUSETTS.

APPARATUS FOR ASSEMBLING TREAD UNITS.

Application filed August 19, 1921. Serial No. 493,751.

*To all whom it may concern:*

Be it known that we, CORNELIUS B. AMES and GEORGE F. WIKLE, citizens of the United States, and residents of Cudahy and Milwaukee, respectively, in the county of Milwaukee and State of Wisconsin, have invented certain new and useful Improvements in Apparatus for Assembling Tread Units, of which the following is a specification.

Our invention relates to methods and apparatus for assembling tread units and the principal object of our invention is to provide a new and improved method and new and improved apparatus for effecting such assembly. In the drawings accompanying this specification and forming a part thereof we have shown, for purposes of illustration, one form which our invention may assume. In these drawings:—

Figures 1ª, 1ᵇ and 1ᶜ represent a general plan view of our apparatus shown as cut into three sections, Figure 2 is a section on the line 2—2 of Figure 1ª, Figure 3 is a section on the line 3—3 of Figure 1ᵇ, while Figure 4 is a detailed view of the cushion applying mechanism shown in Figure 1ª.

The apparatus shown in the drawings consists of a long table 11 provided with an endless belt 12 passing thereover and with a tread laying device 13, a breaker strip laying device 14, and a cushion laying device 15.

The tread laying device 13 consists of a scale pan 16 on which the treads may be weighed, a pair of skiving boards 17 on which the treads may be cut and skived, and a pair of guides 18 between which the tread is laid onto the belt 12. These guides 18 act to position the tread accurately upon the belt 12 and may be made adjustable to accommodate different width treads.

The breaker laying device 14 comprises a rack 19 upon which the strips are placed preparatory to use and a table 20 from which the strips are applied. The table 20 consists of two halves 21 each of which is provided with a ridge 22 and an upstanding edge piece 23 to thereby form on each half a channel 24 in which one member of a split breaker may be placed. Each half 21 of the table 20 is supported on a block 25 positioned to form side guides for the belt 12 and supported by the main table 11. The ridges 22 may be adjustable on the table halves 21 and the table halves 21 may be adjustable on the blocks 25 and in this manner the device may be readily adapted to breaker strips of various widths.

The cushion applying device 15 comprises an endless belt 26 mounted upon a pair of drums 27 and 28 supported in a framework 29 carried by the main table 11. This framework also carries a roller 30 positioned just above the belt 12 and adapted to receive the cushion strip 31 as it is delivered from the belt as it passes downward around the pulley 27.

The belt 12 at the right end passes over a pulley 32 and at the left end passes over a pulley 33 driven by an electric motor 34 through a driving train 35. The pulley 33 also carries a belt 36 passing over the pulley 28 and in that manner driving the cushion applying belt 26. The operation of the motor 34 is controlled by a switch indicated generally at 37 and shown as provided with an exterior handle 38 to which is secured a cable 39 extending on one side over a pulley 40, thence to the far end of the table 11, across to the opposite side of the table, back along the table 11, over a suitable pulley down to a point below a handle 38, and thence over a suitable pulley 41 back to the handle 38.

In operation, the belt 12 is normally continuously operated but this operation may be controlled from any point along the table 11 by means of the cable 39. The operator at 13 prepares a tread member and places it on the belt 12 between the guides 18 which accurately locate the member on the belt. The tread member is then carried along by the belt 12 until it passes under the table 20 whereupon the breaker strip or strips lying on the table 20 are drawn over the end of the table 20 and pressed against the tread 12 to thereby become partially affixed thereto so that continued advance movement of the tread will draw the breaker strips from the table 20 onto the tread during which action the strips will be guided by the ridges 22 and edge piece 23. After the strips have been drawn from the table 20 a second set will be placed thereon from the rack 19 ready for use with the succeeding tread. When the tread member with the breaker strips applied reaches the end of the cushion applying member 15 the cushion has been placed upon the belt 28 and will be fed down about the drum 30 to meet the tread and breaker members and will then pass under the roller 30 which will thereupon exert pressure upon the assembled tread to press the parts tightly together. The assembled tread is then removed from the left hand end of the belt 12.

The disclosure herein is illustrative only and is subject to many modifications and changes. In particular the edge pieces 23 may be removed and a single breaker strip used, the belt 26 may be omitted and the cushion applying strip moved down manually, and the breaker strip or strips may be applied initially to the cushion strip and the tread strip applied thereafter instead of applying the breaker to the tread and then applying the cushion as shown. Our invention is not limited to the embodiment herein illustrated.

We claim:

1. In a tread unit assembling device a traveling support for receiving a tread element, guides for positioning the element thereon, a stationary support positioned above and parallel to said first mentioned support for positioning a second tread element and from which the second element may be moved into assembled relation with the first element, a moving support parallel to said first mentioned support adapted to position a third tread element and move the latter into assembled position with the previously assembled elements on said first mentioned support.

2. In a tread unit assembling device a traveling belt for receiving a tread element, guides for positioning the element thereon, a stationary support positioned above and parallel to said belt for positioning a second tread element and from which the second element may be moved into assembled relation with the first element, a second belt, parallel to said first belt, adapted to position a third tread element and move the latter into assembled position with the previously assembled elements on said first belt.

In testimony whereof we have signed our names to the above specification.

CORNELIUS B. AMES.
GEORGE F. WIKLE